United States Patent
Schrock et al.

[11] Patent Number: 5,923,908
[45] Date of Patent: Jul. 13, 1999

[54] CAMERA WITH TOUCH SENSITIVE CONTROL

[75] Inventors: Anthony W. Schrock, Rochester; Paul E. Spencer, Livonia, both of N.Y.

[73] Assignee: Eastman Kodak Company, Rochester, N.Y.

[21] Appl. No.: 08/960,822

[22] Filed: Oct. 30, 1997

[51] Int. Cl.⁶ ................................................. G03B 17/00
[52] U.S. Cl. ............................ 396/85; 396/88; 396/263; 396/287; 396/299
[58] Field of Search ................................ 396/85, 88, 263, 396/268, 299, 287, 290, 502, 291, 292

[56] References Cited

U.S. PATENT DOCUMENTS

| | | | |
|---|---|---|---|
| 3,599,548 | 8/1971 | Hennig | 396/543 |
| 4,199,245 | 4/1980 | Nakai et al. | 396/263 |
| 4,206,990 | 6/1980 | Imura et al. | 396/129 |
| 4,247,188 | 1/1981 | Kobori | 396/263 |
| 4,529,291 | 7/1985 | Mizogui | 396/243 |
| 4,697,898 | 10/1987 | Wakabayashi et al. | 396/88 |
| 4,827,347 | 5/1989 | Bell | 348/333 |
| 5,218,399 | 6/1993 | Izumi et al. | 396/292 |
| 5,408,287 | 4/1995 | Winegarden et al. | 396/502 |
| 5,461,453 | 10/1995 | Watanabe et al. | 396/263 X |
| 5,541,656 | 7/1996 | Kare et al. | 348/334 |
| 5,689,742 | 11/1997 | Chamberlain, IV | 396/313 |

OTHER PUBLICATIONS

Parts of the Nikon Coolpix 300; pp. 5,6,8,28,30,32Photograph, anonymous, Date unknown.

*Primary Examiner*—W. B. Perkey
*Attorney, Agent, or Firm*—Gordon M. Stewart

[57] ABSTRACT

A camera having a touch sensitive control with first and second positions spaced apart along a surface of the camera, and a shutter. A processor is connected to the touch sensitive control and the shutter, so that as a user slides a finger from the first to the second positions, the shutter is operated. The sliding shutter control inhibits vibration during picture taking while allowing a two-position shutter control. The touch sensitive control may particularly be a touch sensitive screen and icons controlling other camera functions can be presented thereon. These camera control icons can be re-positioned or re-sized on the screen to suit user preferences and/or physical limitations.

13 Claims, 4 Drawing Sheets

CAMERA WITH TOUCH SENSITIVE CONTROL

FIELD OF THE INVENTION

This invention relates generally to the field of photography, and in particular to the field of cameras and camera controls.

BACKGROUND OF THE INVENTION

Modern cameras have an increasing number of features requiring more interaction with the user, such as setting time and date, flash operation, and exposure controls. To facilitate interactions with the users, these cameras incorporate a display, such as a liquid crystal display (LCD) screen. Many manufacturers use a combination of buttons, switches, and dials for the user interface. A camera with a reconfigurable mechanical button is described in U.S. Pat. No. 5,408,287.

The main camera function is that of the shutter release button. Desirable features for this function include intuitive location so the user can find it by touch, low force operation, low component cost, and a two position activation feature, where the first position causes the camera to perform calculations for focus range detection, exposure calculation, automatic flash activation, and user notification of parameters such as low light level that may affect image quality. The second position, which is reached after passing through the first position, activates the shutter. U.S. Pat. No. 4,247,188 is an example of the prior art using this two position activation. This allows the user to frame and "lock" settings related to the current image, and in the case of user notification functions, such as a warning light, the user can elect to not take the picture and take corrective action.

FIG. 1 shows a user interface according to the prior art, with camera 10, a conventional display screen 12, shutter release button 14, and user interface buttons 16 and 18. One of the problems with the current art is the increasing number of functions require more buttons and complex menu schemes to provide the interface functions with the fewest number of buttons. Additionally, the location of the shutter button 14 on camera 10 as shown in FIG. 1 can cause camera shake, especially if the button is "punched". It is well known in the art to use an electronic shutter release to reduce the force required for shutter activation, as described in U.S. Pat. No. 4,199,245. However, placing an electronic shutter release at the same location as a mechanical shutter release encourages using the same force level.

In another example of the current art, the Nikon Coolpix 300 digital camera uses a touch screen display as the user interface. It has a conventional two position shutter release button, as well as a triggered shutter activation from touching a permanent icon adjacent to the display screen. However, this second shutter release does not have a two position activation, so there is no means to use the partial activation as described earlier Another example of using touch screens with cameras (specifically electronic cameras) are described in U.S. Pat. No. 4,827,347. The display is used to select images from a plurality of displayed images.

It would be desirable then, to provide a camera with many controls for controlling different camera functions, and yet which controls permit a user to readily find and use such controls. It would further be desirable in the case of a shutter control, if a two position shutter function could be preserved but with a reduction in the tendency of a user to "punch" the control with consequent camera vibration during picture taking.

SUMMARY OF THE INVENTION

The present invention recognizes that a way to provide shutter control with little or no vibration when the shutter is used, is to provide the shutter as a touch sensitive control. Further, the present invention realizes that a way to provide many camera controls which can be re-located and sized as desired by a user, and a way to provide multiple position controls (such as a two-position shutter or a zoom lens) while avoiding vibration during picture taking, is to provide the controls on a touch sensitive display which is under the control of a processor. The present invention then, provides a camera which in one aspect comprises:

(a) a touch sensitive control having first and second positions spaced apart along a surface of the camera;

(b) a shutter; and (c) a processor connected to the touch sensitive control and the shutter, so that as a user slides a finger from the first to the second positions, the shutter is operated.

The invention provides that the touch sensitive control may particularly be a touch sensitive screen, in which case the processor can display on the screen a shutter icon with first and second positions on the icon which act as the foregoing first and second positions.

In another aspect of the present invention, the touch sensitive control or icon can be used for controlling a zoom lens, so that a user can select multiple zoom positions of the camera by touching respective positions on the icon.

In a still further aspect of the present invention, there is provided a camera comprising:

(a) a touch sensitive screen;

(b) a camera control which controls at least one function of the camera; and (c) a processor connected to the touch sensitive screen and the camera control, to display a camera control icon at different user selectable positions or sizes on the screen, so that touching the icon controls the corresponding camera function.

The present invention allows for some or all of the user interface through the display screen and touch input. This reduces the parts count, and allows for more flexibility in the user interface. In addition, incorporating the shutter release in the touch screen interface further simplifies the electronics of the camera. The provision of a "touch and slide" shutter control allows for a partial push pre-exposure feature, while the sliding motion provides the shutter release feature and has the added advantage of less camera shake. The invention also provides easily reconfigurable icon positions and sizes, specifically for shutter, allowing the user to customize the camera in accordance with an individual's picture taking style or physical requirements.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

By a touch sensitive control (such as a touch sensitive screen) in the present invention, unless a contrary indication appears, is referenced a control which can sense the touch of a user's finger or instrument of similar size (for example, a stylus). Such touch sensitive controls generally require little or no pressure to operate, although there will typically be at least some small amount of pressure from a finger or other instrument used to access the control. A touch sensitive control allows a processor connected to the control, to determine the location of a finger or similar sized instrument, on the control. For example, a touch sensitive screen allows a processor connected to it to determine the location on the screen being touched by the finger or instrument.

Figure 1:
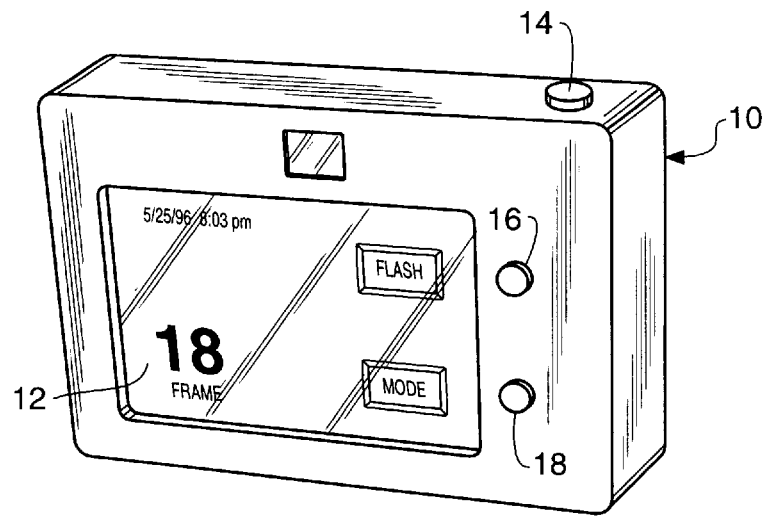
FIG. 1 is a rear view of a camera showing a prior art user interface (see Background, above)
Figure 2:
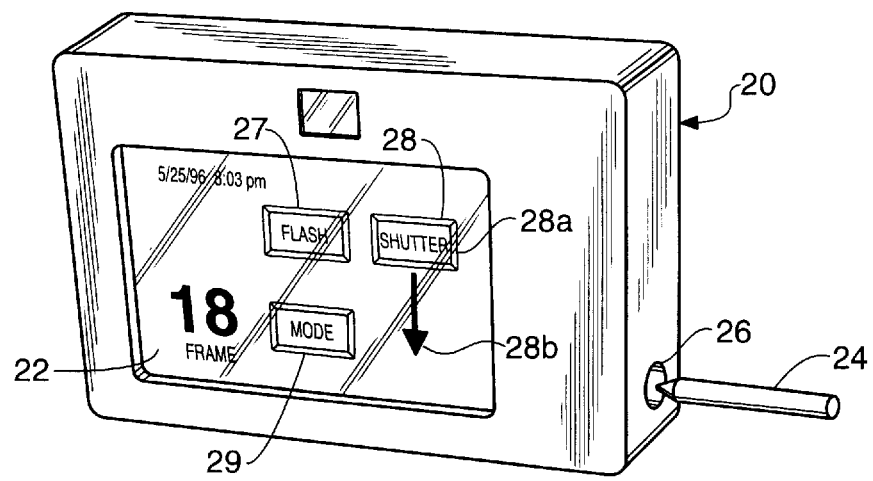
FIG. 2 is a rear view of a camera with a user interface of the present invention.

Referring to FIG. 2, there is shown the back of a camera 20 with a touch sensing liquid crystal display ("LCD") screen 22 and a shutter release activation 28 according to the preferred embodiment of the invention. Camera 20 has a housing with a lens (not shown), the housing when closed being essentially light tight other than for light entering through the lens. A sensor location is provided in camera 20 to receive light from an image passing through the lens after passing through a shutter. Camera 20 may have an electronic sensor (such as a CCD) at the sensor location) or be constructed to receive a frame of a conventional light sensitive silver halide emulsion film at that location. A battery holder is provided within the camera housing. Camera 20 typically has dimensions of no greater than 30 cm, by 20 cm, by 10 cm, and a weight (without batteries) of no greater than 2 or 3 kg (and usually less than 1 kg).

Camera 10 also has the additional feature of a stylus input device 24 and stylus storage space 26 for adding notation to images, the operation of which is described in U.S. patent application Ser. No. 08/808,702 filed Feb. 28, 1997, now U.S. Pat. No. 5,845,161 which is incorporated by reference. The touch sensing screen 22 can be any one of devices well known in the art, such as resistive, capacitive, or electromagnetic position sensors that are placed in front or behind the display. A number of touch screen technologies are described in the Nov. 9, 1995 issue of Electronic Design News, pg. 52–62. That reference and all other references cited herein, are incorporated in this application by reference. FIG. 2 shows the display in the "main" or default mode. This mode displays standard information about the camera, such as frame number, film speed, date and time, and virtual "buttons" in the form of icons 27 and 29, on the screen 22, as well as a shutter release activation icon 28. Touching icon 27 allows the user to control camera flash, while touching icon 29 allows a user to access other camera function controls (in the form of icons displayed by microprocessor 30), such as exposure program parameter control. The touch sensing electronics detects the coordinates of the stylus or finger touch and responds to a touch at a label location in the same manner as a button.

Figure 3:
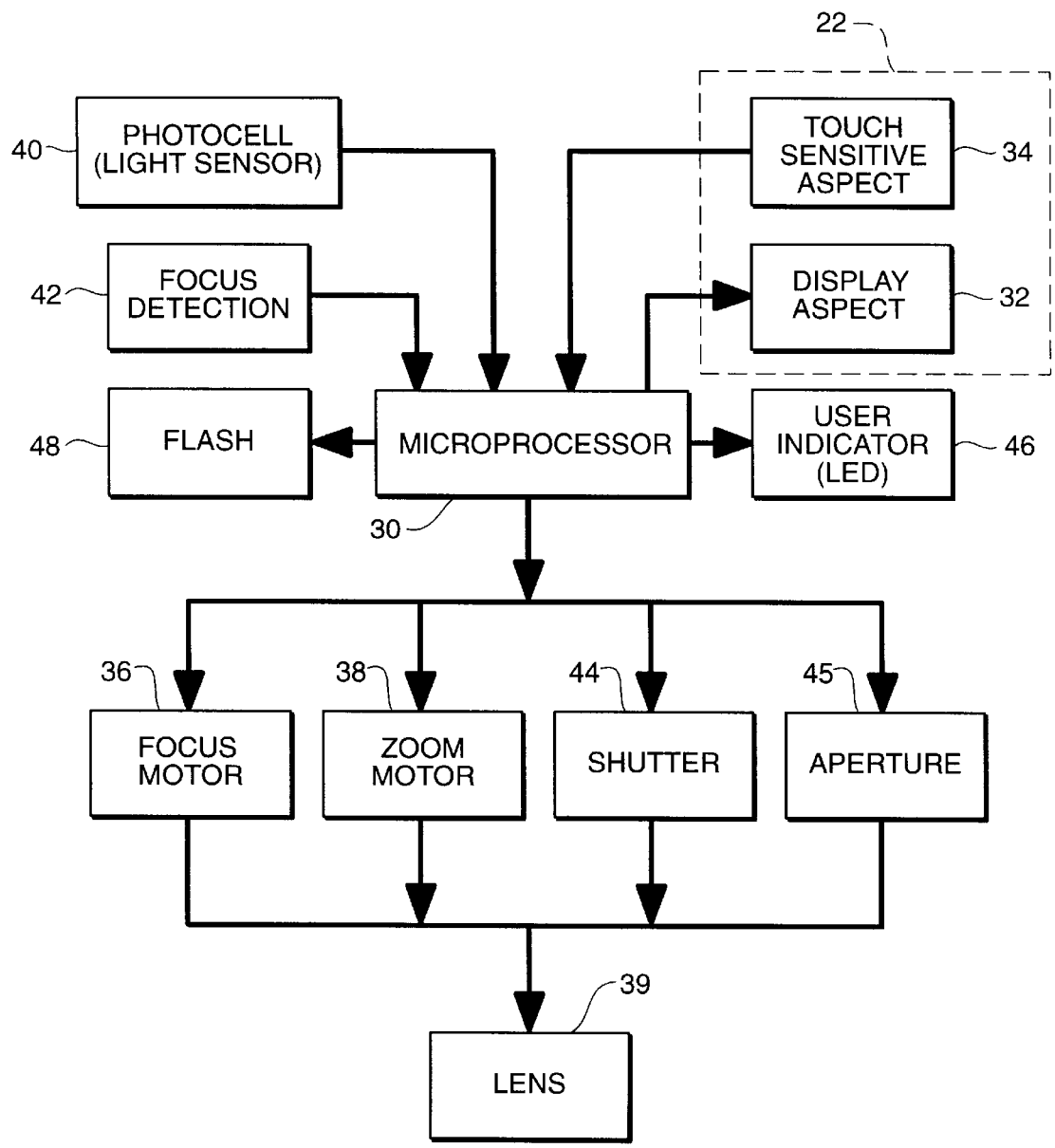
FIG. 3 is a block diagram of the camera of FIG. 2.

FIG. 3 shows a block diagram of the camera system, showing the operative coupling between the camera microprocessor 30 and the elements of the camera system. Microprocessor 30 can be any microprocessor programmed to carry out the functions required of it, as described in this application. Alternatively, microprocessor 30 can be replaced by equivalent hardware elements or a combination of hardware/software as required to perform all required functions. Microprocessor 30 causes icons to be displayed on the display aspect 32 of touch sensitive screen 22, and also receives signals from the touch sensitive aspect 34 which indicate the location of a user's finger or other instrument. Based on the position of a user's touch on touch sensitive screen 22, the microprocessor will operate as if a button corresponding to the icon location were pressed. The user indicator 46 incorporates a device such as a light emitting diode (LED) to indicate conditions requiring user intervention, such as flash not ready. Microprocessor 30 can determine one or more picture taking parameters based on data received from a light sensor 40 and focus detection system 42. Picture taking parameters include camera operation parameters as well as parameters of the scene to be photographed, and can include scene light conditions, flash required, camera flash not ready, and the like. Microprocessor 30 can control camera parameters, such as camera lens focus control motor 36, a zoom lens control motor 38, a shutter 44, and an aperture 45, based on the signals received from sensor 40, focus detection system 42, and any user input parameters.

Returning to FIG. 2, when the user touches the shutter icon 28 of touch sensitive screen 22, microprocessor 30 checks focus range and exposure data, in a similar manner as is done upon a partial push of a mechanical shutter button. When any determined picture taking parameter is outside a preselected value, microprocessor 30 can activate user indicator 46 to warn a user, or alternatively or in addition, can disable a camera function such as shutter activation. To actually take the picture, the user's finger is slid in the direction of the arrow in FIG. 2 (that is moved from a first position 28a to a second position 28b of shutter icon 28). This corresponds to a full shutter press of a conventional mechanical shutter button in conventionally shuttered cameras. Operation in this manner prevents "punching" of the shutter button, reducing camera shake. An additional advantage of this feature is that during data entry modes, such as setting the date and time, processor 30 removes shutter icon 28 from display aspect 32 of screen 22 (or alternatively disables shutter activation), eliminating inadvertent exposures.

Figure 4:
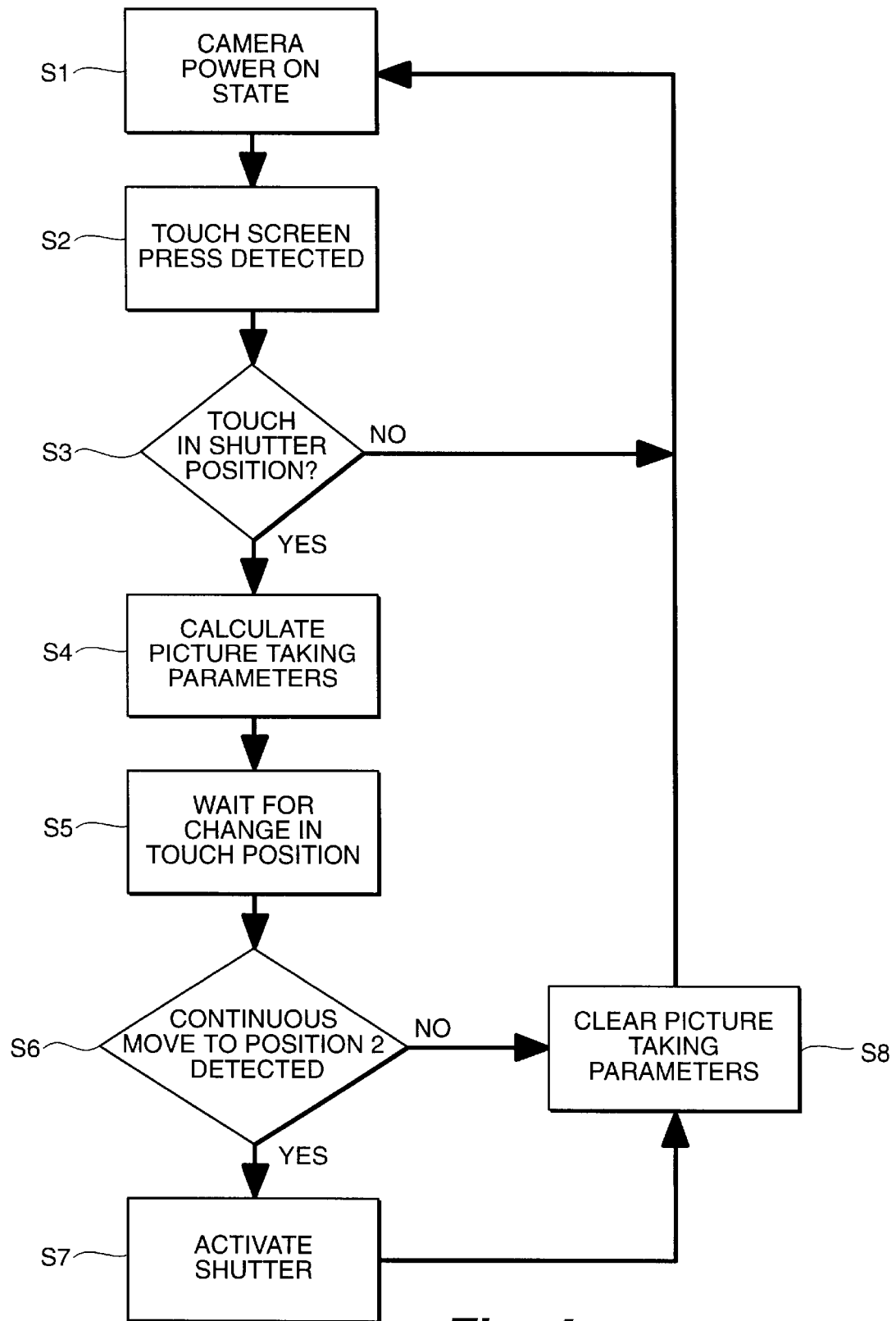
FIG. 4 is a flowchart illustrating operation of the camera of FIG. 2.

To better understand the operation of the shutter activation, reference is made to the flow chart of FIG. 4. At step S1, the camera has been turned on and is in the powered up idle state, ready to take a picture. At S2 a finger touch is detected on the touch screen sensor aspect 34. Step S3 checks to see if the touch is on the first position 28a of shutter icon 28. If not, control returns to S1 or the operation of other buttons, depending on where the touch occurred. If the user is touching the first position 28a of the shutter icon 28, processor 30 performs picture parameter calculations such as focus and exposure values at step S4. Control passes to S5, which waits for a change in the touch position on touch sensitive screen 22. If the change is anything but a slide in the direction of the arrow, such as a movement or a lift of the finger, control passes to S8, which clears the calculated parameters and returns to S1. If a slide to the second position 28b occurs, the camera activates the shutter and returns to the idle state S1, passing through S8. It is important to note that if the finger touches anywhere on the screen other than the beginning of the shutter activation stroke, control will not pass to S4, and no picture will be taken.

Figure 5:
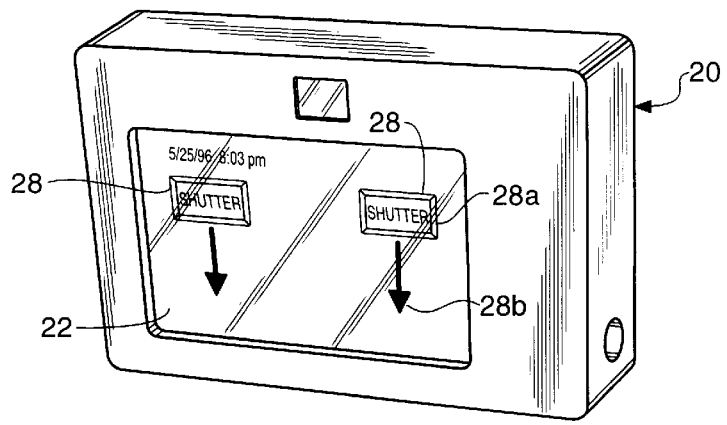
FIG. 5 is a view similar to FIG. 2 but illustrating a selectable control icon positioning feature of the present invention.

FIG. 5 shows another feature of the invention, as a reconfigurable shutter icon 28. As shown in the embodiment of FIG. 5, the user can select from more than one position for the shutter release icon. This can be accomplished by allowing mode icon 29 to access a user selectable shutter icon positioning mode. In this mode, the user is allowed to either pick from a plurality of pre-selected positions on screen 22, or to "drag and drop" shutter icon 28 to whatever location on touch sensitive screen 22 is desired. For example then, shutter icon can be moved between the right and left hand side positions on display 22 as shown in FIG. 5.

Figure 6:
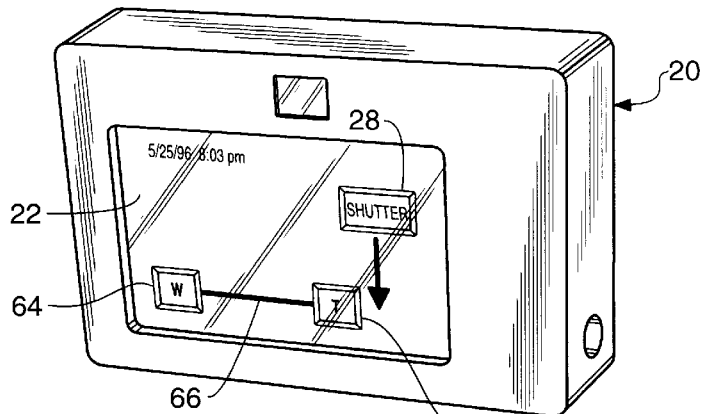
FIG. 6 is a view similar to FIG. 2 but illustrating a zoom control feature of the present invention.

FIG. 6 shows mode of the touch screen interface, which incorporates a zoom control function. This mode can also be accessed through mode control icon 29. In this mode, the user can zoom the lens toward a telephoto or a wide angle position by pressing a telephoto icon portion 68 or the wide angle icon portion 64, respectively, of a zoom icon. Processor 30 will make the corresponding zoom adjustments through zoom motor 38. In addition, the screen gives the added advantage of touching at a position anywhere along a line 66 of the zoom icon, which causes the zoom to go directly to that zoom position rather than continuously pressing the telephoto or wide angle icons. As another option, processor 30 can sense the rate of a sliding motion along line 66 and adjust zoom motor 38 at a corresponding rate of the detected sliding motion.

Figure 7:
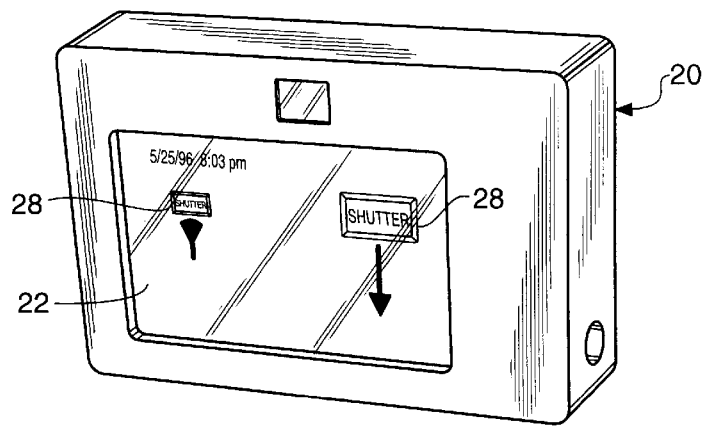
FIG. 7 is a view similar to FIG. 2 but illustrating a selectable control icon sizing feature of the present invention.

FIG. 7 illustrates screen 22 after the user has entered a user selectable icon sizing mode. This mode can be accessed through mode icon 29. This mode allows a user to reconfigure touch screen icons by allowing users to select different sizes for any given icon, depending on personal preferences or physical requirements. Thus, shutter icon 28 can be changed in size between a larger size (shown on the right hand side of FIG. 7) and a smaller size (shown on the left hand side of FIG. 7). When in this mode, a user can change the size of an icon by touch selection by either selecting one of a number of predetermined possible sizes, or selecting any size such as by dragging one end of the icon.

It will be appreciated that other camera control icons, in addition to shutter control and zoom control, can be accessed through mode icon 29, for use of different camera controls corresponding to those icons, and/or for modifying the position or size of any of those icons on screen 22. Such icons can represent camera controls such as shutter speed, aperture control, flash unit control, control of the film position within the camera (e.g. load, rewind, advance/back one frame, and the like), camera power control, captured picture format control (e.g. capture a picture in an actual panoramic, high definition television, or other aspect mode, or record an indication on the film of such a selected mode). Also, at least for shutter icon 28, this could be replaced by an equivalent permanent touch sensitive control on the camera housing which would still provide the advantage of avoiding camera shake during picture taking. However, this would not provide the advantage of a re-configurable (location and size) shutter control.

It will be understood that other variations and modifications can be effected within the spirit and scope of the invention. Accordingly, the present invention is not limited to such specifically described embodiments.

PARTS LIST 10 camera (prior art)
12 display screen (prior art)
14 shutter release button
16,18 prior art user interface buttons
20 camera
22 touch sensitive screen
24 stylus input device
26 stylus storage space
27 flash control activation icon
28 shutter release activation icon
28a first position
28b second position
29 mode control icon
30 microprocessor
32 display aspect
34 touch sensitive aspect
36 focus control motor
38 zoom lens control motor
39 lens control
40 light sensor
42 focus detection system
44 shutter
45 aperture
46 user indicator (LED)
64 wide angle icon portion
66 a line of zoom icon
68 telephoto icon portion

What is claimed is:

1. A camera comprising:
   (a) a touch sensitive control having first and second positions spaced apart along a surface of the camera;
   (b) a shutter; and
   (c) a processor connected to the touch sensitive control and the shutter, so that as a user slides a finger from the first to the second positions, the shutter is operated.

2. A camera comprising:
   (a) a touch sensitive screen;
   (b) a shutter; and
   (c) a processor connected to the touch sensitive screen and the shutter, so that as a user slides a finger from a first to a second position, the shutter is operated.

3. A camera according to claim 2 wherein the processor causes the touch sensitive screen to display a shutter icon, and wherein the first and second positions correspond to first and second positions of the icon.

4. A camera according to claim 2 additionally comprising a sensor to sense at least one scene parameter, and wherein when the user's finger is placed on the first position of the icon the processor determines one or more picture taking parameters from the sensor information.

5. A camera according to claim 4 wherein the processor activates a user indicator or disables shutter activation, when a determined picture taking parameter is outside a preselected value.

6. A camera according to claim 2 wherein the processor resets the determined picture taking parameters when a user moves from touching the first position to another position on the touch screen other than the second position.

7. A camera according to claim 2 wherein the processor can display the shutter icon at different user selectable positions on the screen.

8. A camera according to claim 7 wherein the processor has a user selectable shutter icon positioning mode, which displays the shutter icon and allows the user to move the position of the icon on the screen by touch selection.

9. A camera comprising:
(a) a touch sensitive screen;
(b) a zoom lens control with multiple zoom positions; and
(c) a processor connected to the touch sensitive screen and the zoom control, to display a camera zoom icon with a first position, a second position, and one or more intermediate positions, so that a user can select multiple zoom positions of the camera by touching respective positions on the icon.

10. A camera according to claim 9 wherein the processor alters the zoom position at a rate corresponding to the rate of a sliding motion detected along the zoom icon.

11. A camera comprising:
(a) a touch sensitive screen;
(b) a camera control which controls at least one function of the camera; and
(c) a processor connected to the touch sensitive screen and the camera control, to display a camera control icon at different user selectable positions or sizes on the screen, so that touching the icon controls the corresponding camera function.

12. A camera according to claim 11 wherein the processor has a user selectable icon positioning or sizing mode, which displays the icon and allows the user to change the position or size of the icon on the screen by touch selection.

13. A camera according to claim 11 wherein the camera control is selected from a camera shutter, aperture control, flash unit control, film position control within the camera, power control, captured picture format control, and zoom control.

* * * * *